Patented Aug. 20, 1935

2,011,558

UNITED STATES PATENT OFFICE 2,011,558

FOOD PRODUCT

Abraham Berlatsky, Chicago, Ill.

No Drawing. Application June 28, 1933,
Serial No. 678,055

2 Claims. (Cl. 99—11)

This invention relates to food products and more particularly to a condensed cream product in convenient compact form.

It is an object of my invention to provide an improved, dry, non-hygroscopic cream product having highly efficient "keeping" qualities and put up in compact, convenient form for transportation and use.

It is a further object to produce a concentrated cream product which, when added to hot liquids, will cream nicely, avoiding curdling and precipitation.

It is a further object to provide a product of the class described wherein the butterfat of the cream is dried in particles and encysted by preservative substances which do not detract from the solubility or any other desirable features of the entire product.

Another object is to provide a dry, concentrated cream product which may be prepared in the form of a compressed tablet or loaf and wherein the natural ingredients have the requisite bonding qualities for preventing crumbling and disintegration of the tablet or loaf.

Still a further object is the provision of a simple and efficient method for producing a concentrated, dry cream product and which may be carried out economically without requiring the use of special or elaborate apparatus.

These and other objects and advantages of the invention will be more fully set forth in the following description.

Milk consists of water in which the various food solids are either dissolved, diffused or suspended. These food solids may be roughly classified as follows:—

(a) Fat suspended in globular form
(b) Lactose or milk sugar in true solution
(c) Various minerals which are partly in chemical union with other compounds and partly in true solution in the water phase of the milk
(d) Casein, albumen and other proteins.

Milk and cream also naturally have various enzymes, catalyses and oxydases, which hasten the destruction of the product containing them.

For creaming coffee, tea, hot chocolate drinks, soups and the like, the fat and other solid substances are desired, but not the water. Concentration of milk by evaporation and also separation of the fatty ingredients from the milk are both well known in the art and of course no claim of invention as to these steps is made herein, although the same may be employed as part of my improved method and in the production of my improved product.

Milk evaporated to a thick and viscid fluid contains an insufficient amount of fatty solids in proportion to non-fatty solids to be of best or full service as a cream, and even then contains so much water as to be heavy of shipment and quickly perishable when opened for use.

When the concentration of fat has been effected by means of centrifugal separation of the cream from the milk a product is obtained which is too rich in fat and which still is so watery as to be both heavy and quickly perishable.

In ordinary milk the ratio between the fatty and the non-fatty solids, by weight, is about as 1.0 to 2.46, while in 20% cream the ratio is as 1.0 to 0.36. The 1.0 to 2.46 ratio is too lean of fat to be a cream, while the 1.0 to 0.36 ratio is far too deficient in colloidal solids to adequately cover and protect the fat from contact with air, when dried.

It is well known that milk and cream and their ordinary products contain acids. It is also well known that the casein constituent of milk and cream is curdled and precipitated by acids, especially when hot, as would be the case in hot coffee and similar beverages and soups if the acid is too high. Even nominally sweet cream, if reduced to powder form will, if added to hot coffee, curdle and form objectionable casein specks.

Moreover, in ordinary powdered cream, the fat is not protected against oxidation and thus spoils rather quickly lessening its degree of usefulness.

My new product combines the desirable features of the most efficient proportion of fatty to non-fatty solids with that of very low moisture content, thus increasing the keeping qualities and decreasing the costs of transportation. It also recognizes the balance between free and combined acids and the precipitation of casein, and avoids this weakness in the finished product. It further excludes air, with its oxidizing effect, as well as eliminates from the natural milk other destroying agents and ingredients.

My preferred method for making the improved food product herein disclosed comprises the following steps:—

Fresh milk is first separated into cream and skimmilk in order to have available cream of a high grade for use. Clean fresh cow's milk is preferred (the morning milk being kept separate from milk of the previous evening) and is preferably delivered to the processing plant within a few hours after being drawn from the cows.

Sufficient of the separated fresh cream is then added to a quantity of skimmilk to build the fat content of the blended liquid up to the desired ratio of fat to non-fatty matter. I find the best results to be obtained from a fat to non-fatty solids ratio of about 1.0 to 1.0 by weight. The product produced from ingredients in this ratio is far superior in keeping qualities to one of higher fat ratio. I prefer to obtain the above stated 1.0 to 1.0 fat to non-fatty ratio in the solids by building up the fat content in the liquid to about 18% by weight, by the addition of cream and then compensating for this extra fat by the addition of an alkali caseinate to re-establish the one-to-one ratio. Sodium or potassium caseinate are satisfactory. The addition of the alkali caseinate results in producing a higher total solids percentage in the liquid and in reducing the crystalline non-fatty solids and proportionally increasing the colloidal non-fatty solids thereby aiding in the encysting of the butterfat with a membrane of colloidal substances. The proportional increase of colloidal non-fatty solids not only affects the keeping qualities of the fat, but increases the solubility of the finished dry product.

I build up the colloidal solids content of the finished product by adding small quantities of colloidal substances, such as pure food gelatin and/or standard quality vegetable gums, such as gum tragacanth. The added colloidal substance or substances should total about 1% by weight of the total solids in the mixture.

When the liquid has been suitably standardized as between fat and non-fat and as between colloidal and crystalline non-fatty solids, then the acidity of the liquid is standardized, usually downward, by the addition of any suitable alkali, such as calcium or sodium hydroxide or di- or trisodium phosphate, sodium citrate or other acid-neutralizing agents. This is continued until a total acidity, measured as lactic acid, of about 0.12% is reached. This is to be the figure after the blended liquid has been heated to at least 130 degrees F.

Following acidity standardization, the liquid is to be heated in the manner customary for the pasteurization of milk and cream, except that the temperature is to be raised to between 150 to 180 degrees F. and there held for 15 to 20 minutes or longer for the destruction, not alone of the bacteria common to milk, but the various oxydases and enzymes also.

Preferably, after heating and pasteurization the liquid is spray dried in the manner usual in the production of powdered milk. Various conventional apparatus may be utilized, such as the devices shown in U. S. Patents No. 1,506,226 and No. 1,817,048.

The dried flakes or particles are next collected and may be packed in containers for shipment if it is desired to utilize the product as a powder.

I, however, prefer to compress the desiccated product into tablets, cubes or loaves of the most compact size and shape to efficiently serve the purposes for which the product is intended, and to be least expensively transported.

The nature of the desiccated powder, because of the colloidal substances as well as because of the natural ingredients such as the non-fatty and fatty solids is abundant in adhesives and bonding material to thoroughly hold the particles together. Tablets or cubes so constructed will not crumble or disintegrate readily and consequently are very convenient for use in homes, restaurants, dining cars and the like for creaming coffee, soups and various beverages.

My improved product is light in weight, since substantially all water has been removed from the ingredients; will dissolve readily in most beverages and due to the balance of fatty and non-fatty solids and the standardization of acidity, will not precipitate when utilized with a hot beverage. Particles of the fatty ingredients are encysted with a protective coating of colloidal materials and alkali caseinates thereby substantially eliminating the destructive effects of oxidation. The bacteria, enzymes and oxydases are eliminated by pasteurization of the mixture from which the product is made at relatively high temperatures for a period of time.

From the foregoing description it will be seen that I have provided an improved dry cream product which will not absorb moisture, which has unusual keeping qualities and which may be manufactured at very low cost.

It further will be seen that I have provided a simple and efficient process for making, commercially and otherwise, my said improved product.

What is claimed is:—

1. The process of making a dry dairy food product having the basic nature of cream which consists in preparing a mixture of skimmilk and cream standardized to have a ratio of substantially one-to-one by weight between the fatty and non-fatty solids, increasing the fat content of the mixture by the addition of cream, and then compensating for the extra fat by the addition of an alkali caseinate to re-establish the substantially one-to-one ratio between fatty and non-fatty solids, thereby reducing crystalline non-fatty solids and obtaining a higher total solids percentage in the liquid, pasteurizing the mixture and desiccating the pasteurized mixture, and compressing the dry material into a coherent mass and in so doing bonding the material by means of the adhesive colloidal ingredients.

2. The process of making a dry dairy food product having the basic nature of cream, which consists in preparing a mixture of skimmilk and cream wherein the fat content is roughly about 18% by weight, standardizing the mixture to establish substantially a ratio of one to one between the fatty and non-fatty solids by the addition to the mixture of an alkaline caseinate and thereby increasing the colloidal non-fatty solids and decreasing the crystalline non-fatty solids, adding a small amount of edible and soluble non-milk colloid and desiccating the mixture and compressing the dry material into coherent masses and bonding the material together by the natural adhesive ingredients including the colloidal non-fatty milk solids and the non-milk colloid.

ABRAHAM BERLATSKY.